(No Model.)
L. EBERHART.
ANCHOR FOR CHECK ROW CORDS.
No. 281,473. Patented July 17, 1883.
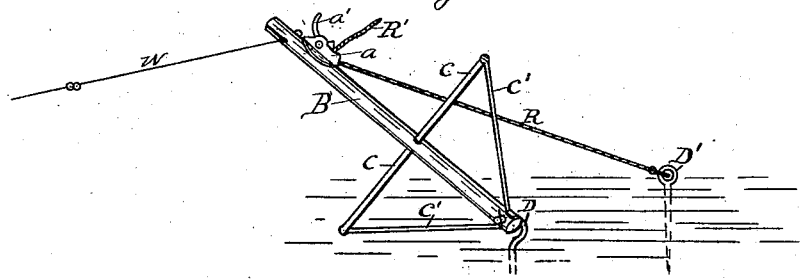
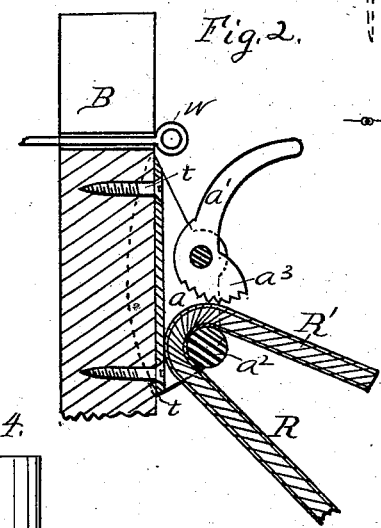
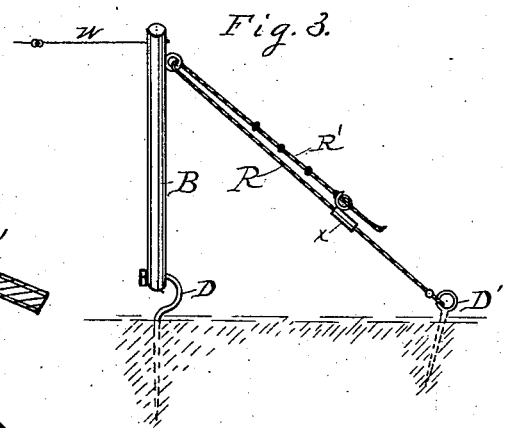
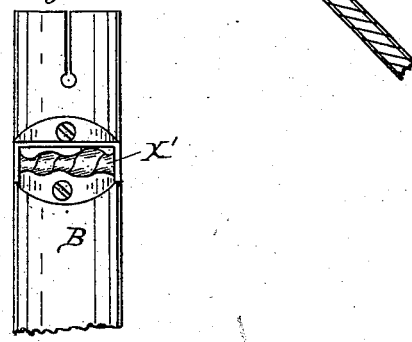
Witnesses,
Thos. H. Hutchins
Wm. J. Hutchins
Inventor.
Lloyd Eberhart.

UNITED STATES PATENT OFFICE.

LLOYD EBERHART, OF JOLIET, ILLINOIS.

ANCHOR FOR CHECK-ROW CORDS.

SPECIFICATION forming part of Letters Patent No. 281,473, dated July 17, 1883.

Application filed February 13, 1883. (No model.)

*To all whom it may concern:*

Be it known that I, LLOYD EBERHART, of the city of Joliet, Will county, State of Illinois, have invented certain new and useful Improvements in Check-Row Anchors, the construction and operation of which I will describe, reference being had to the annexed drawings, making a part of this specification, in which—

Figure 1 is a perspective view; Fig. 2, a vertical section of the clutch that holds the brace-cord; Fig. 3, a side view, and Fig. 4 a front view, of a clutch.

This invention relates to a device for holding firmly the extreme ends of a check-row cord or wire as it is stretched across the field, and is commonly called an "anchor."

Referring to the drawings, B is the tongue, having the lower end pivoted to the ground by the stake D, as shown in Fig. 1, and its upper end having a slot or hole to hold the wire $w$. The brace-cord R has its outer end, behind the tongue, fastened to the ground by the stake D', and its upper end attached to the upper end of the tongue by a clutch. (Shown in Fig. 2.) After the wire $w$ has been placed in the upper end of the tongue B, by taking hold of the end R' of the cord R, it can be pulled up through the clutch over the pin or pulley $a^2$, and retained and prevented from running back by the dog $a'$, as shown in said Fig. 2. By this means any desired tension can be given the wire $w$ instantly without any difficulty. The cross-bar $c$, which prevents the outer end of the tongue B from falling entirely to the ground, is provided with the brace-bars $c'$ $c'$, which are for the purpose of preventing the ends of the cross-bar $c$ from entering the ground too far, and to prevent the cross-bar $c$ from being broken off. These brace-bars $c'$ $c'$ form a long bearing on the ground, and support the tongue better than the cross-bar alone can, as the ends of the cross-bar will otherwise run into the soft earth a long distance when the weight of the wire $w$ is on the tongue.

I am aware cross-bars have been used to support the tongue, so its end, to which the wire attaches, will not lie on the ground; and hence I do not claim that feature independently; but I am not aware any such brace-bars $c'$ $c'$ have ever been used for such purpose, or that any such device has been used to tighten up the check-row wire $w$ in the manner described.

The clutch for holding the brace-cord may be formed as shown in Fig. 4, it being simply a spirally-grooved conical roller, $x'$. The cord can be pulled through under its small end up as tight as desired, and then thrown to one side, where it will be caught between said roller and the tongue, as the roller turns backward, and held firm; also, the brace-cord may have knots along its length, as shown in Fig. 3, to catch in a fork of the catch $x$, fastened permanently on the brace-cord, as shown in said figure.

The cross-bar $c$ may be dispensed with and only the brace-bars $c'$ $c'$ used to support the tongue B. In such case their attachment to the tongue B must be constructed strong enough to support the tongue without the use of the cross-bar $c$.

Having thus described my invention, what I claim as new, and desire to secure by Letters Patent, is—

1. In an anchor for check-row cords, the combination of the tongue B, pivoted at its lower end to the earth, and having the clutch described, and the brace-cord R, arranged in the rear of said tongue, and having one end staked or fastened to the earth, and the other held by said clutch, and adapted to draw and hold the tongue B at any desired position to give a variable tension to the wire $w$ by means of such clutch, as set forth.

2. The combination of the tongue B, cross-bar $c$, and brace-bars $c'$ $c'$, all adapted to operate as and for the purpose set forth.

3. In a check-row anchor, the combination of the tongue B, having the cross-bar $c$ and brace-bars $c'$ $c'$, clutch consisting of the pin or pulley $a^2$ and dog $a'$, brace-cord R, and pins D and D', all adapted to operate as and for the purpose set forth.

4. The combination of the tongue B and brace-bars $c'$ $c'$, all adapted to operate as and for the purpose set forth.

5. In a check-row anchor, the clutch described, in combination with the tongue B, brace-cord R, and check-row wire $w$, all adapted to give a variable tension to the check-row wire $w$, as and for the purpose set forth.

LLOYD EBERHART.

Witnesses:
THOS. H. HUTCHINS,
WM. J. HUTCHINS.